Figure 1:
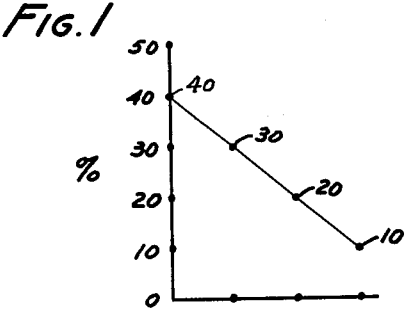

United States Patent Office

3,084,059
Patented Apr. 2, 1963

3,084,059
ROOFING ROCK
Stuart H. Ingram, 1850 Woodlyn Road, Pasadena, Calif.
Filed Aug. 5, 1960, Ser. No. 47,852
13 Claims. (Cl. 106—288)

This invention relates to a mineral aggregate useful for roofing rock.

The term "mineral aggregate" as used herein, means a mixture of particles of a mineral, the particle sizes of which have a particular distribution relative to the volume of the material. The particles themselves may consist not only of natural rock, but also of materials often thought of as by-products of other processes, such as ceramic and tile scrap, and furnace slag. For convenience, all of these materials will be referred to as "rock", and the terms "rock aggregate" and "mineral aggregate" will be used interchangeably.

Rock aggregates are used where the physical properties of the rock are more suitable for the installation than the underlying or surrounding material. One example is rock roofs, where asphalt and felt, which provide waterproofing, but are not very resistant to weathering, are covered by rock, which is.

Materials used for many years to provide a rock covering for asphalt roofs included river gravel, waste rock, chips from quarries, slag from smelters, and ceramic wastes, which could be obtained cheaply nearly everywhere at a cost of not more than $2.00 per ton delivered to the job in bulk. The material, being cheap, is applied liberally. There was no point in trying to improve the properties of such aggregates so as to use less of them for a given job, because they were so cheap, and the aggregates which have been used for many years are largely those which are produced as products of crushers that make aggregates for concrete.

While rock roofs were, in the past, used occasionally on residences, the type was not popular because of the drab color of the available inexpensive materials, and the frequent annoyance of wash-off of loose particles from high-pitch residence roofs. During the post-war period of the 1940's, southern California experienced a tremendous increase in residential construction. Much of this was for low-cost housing, and due to rising prices, the low cost of rock roofs compared to other types of roofing, caused an increased interest in their use. To overcome the drabness, colored rock was introduced in the mineral cover for greater attractiveness. Fortunately for this development in southern California, there was available in the adjacent desert regions rocks of many colors. The new demand was met by the erection of many small crushing plants located wherever colored rock could be found. These plants were high-cost, small-volume operations. Their product had to be trucked 100 miles or more. Their marketing involved expenses of advertising, warehousing, packaging, selling, etc. As a result, prices to the roofer mounted to $20.00 per ton or more in place of the old $2.00 per ton price. It therefore has become important to improve the migration stability of the rock coating for a roof, and to decrease the amount needed to cover the asphalt.

It has thereby become necessary to provide roofing rock which will effectively cover a roof, using the least amount, and without waste. Furthermore, it needs to be effectively bonded to the asphalt so that, on the higher-pitched residence roofs, it will stay in place.

Rock aggregate according to this invention is defined by reference to size ranges, the term "range" being defined by the upper and lower screens which limit the size of the particles contained in it. For the purpose of definiteness, the screens used to define the sizes have circular openings of uniform diameter over the surface of the individual screen. It is to be understood that the screening could be done with other types of screen—ordinary square weave mesh screens, for example, to obtain the same analyses. However, because of the existing lack of standards for describing the actual shape and size of the openings in screens, a screen with circular openings is used as a standard in this specification.

A particle in a given range is one having such dimensions that it passes through an opening of one diameter in the upper screen of the range and is retained by an opening of a lesser diameter in the lower screen of the range. It will be recognized that such passage and retention is at least partly a statistical matter, because any rock will have many transverse dimensions, and, while it might have some dimensions which would enable it to pass through a given screen as well as some which would not, it might not get the smaller dimensions aligned with a screen hole while it is on the screen, and therefore might be retained in an upper range while having a dimension less than the upper limit of a lower range, or might be passed to a lower range while having a dimension larger than the lower limit of an upper range. Thus these sizes ought to be determined by reference to the defined screens, rather than by other means of measurement.

A roofing material according to this invention comprises a mixture of rock particles of heterogeneous size and random contour, these particles being present in a plurality of size ranges. These size ranges for convenience are numbered with successive ascending integers, the range of the smallest size particles being numbered number 1. Rocks in each size range are present in the mixture in the volumetric proportion substantially equal to the number of the range divided by the sum of all the range numbers. The particle sizes themselves are those which would be derived by passage through an upper vibrating screen and retention on a lower one, which screens have circular openings, there being at least two and usually no more than five of said ranges. The diameter of the opening forming the upper screen in the range differs by a substantially constant increment from range to range, and these increments are no less than $\frac{1}{16}''$ and no greater than $\frac{1}{4}''$, being the same increment from range to range in any mixture. The openings in the lower screen of each range are the same as the openings in the upper screen of the next lower range. The lowest screen of the lowest numbered range is of such size as to pass all particles of size which are deleterious to the application of rock to hot asphalt, thereby getting rid of fines and dust which tend to blanket the asphalt and prevent a good bond between rock and asphalt, and also those small sizes which would "drown" in the asphalt.

Figure 4:
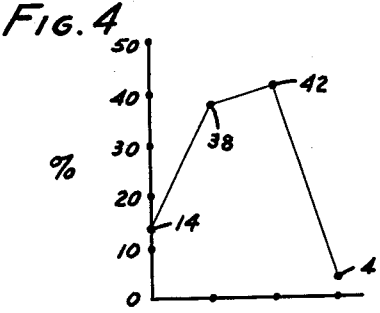
Figure 2:
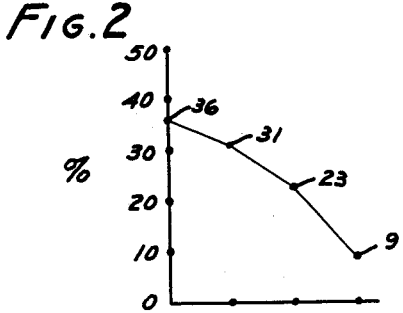
Figure 5:
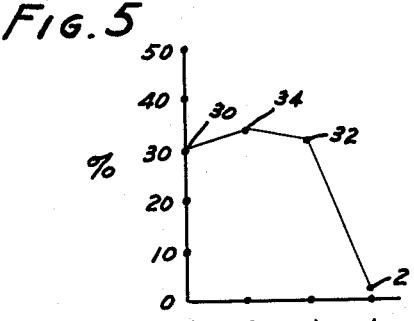
Figure 3:
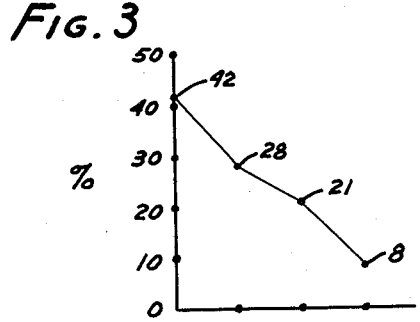

The above and other features of this invention will be fully understood from the following detailed description and the accompanying drawings, in which:

FIGS. 1–3 are graphs showing screen analyses of rock aggregates according to the invention; and FIGS. 4–5 are graphs showing screen analyses of conventional rock aggregates.

The general properties of rock aggregates generally known before this invention are shown by the FIGS. 4 and 5. These aggregates show the typical "bell curve distribution" obtained in conventional crusher operations, where there is some size range in which the greatest percentage per volume of particles fall. Then on either side of this range there will be ranges of particles both larger and smaller, in lesser proportion by volume. The aggregates of FIGS. 4 and 5 were obtained as the products of a pair of opposed rolls, the raw materials being different types of granite.

FIGS. 1–3 show screen analyses of commercial aggregates according to this invention. The materials are volcanic tuff (FIG. 1), and granite (FIGS. 2 and 3).

The prefered materials for the aggregates according to the invention will have individual granules of roughly prismatic or pyramidal shapes, with rough fracture surfaces and sharp fracture edges. The parent rock must be opaque, resistant to weather, and hard enough to resist abrasion of handling during transporting and application. In addition, the rock should have uniform grain structure with equal resistance to crushing strains on all three axes, and therefore more or less equi-dimensional shapes when reduced to size. Micaceous, schistosic, and gneissoid rocks, and those with laminar structure are unsuitable for roofing rock. Suitable rock must fracture with sharp edges and erose surfaces to insure good adhesion to asphalt and good interlocking of individual granules. Glassy lavas are therefore poor, as are coarsely crystalline rocks which tend to break along crystal faces.

If a perfect roofing granule aggregate were spread on a roof with perfection, every area of the asphalt, no matter how small, would be covered by rock. Conversely, each rock granule would have contact with the asphalt, causing adherence to it. There are natural limitations to such perfection. On the small side, particles approaching the size commonly known as dust, are so supported by the air as to be uncontrollable in spreading. Air eddies can remove such sizes completely from parts, concentrating them in other parts. At such concentration points, such extremely fine particles have not sufficient gravity to sink into the apshalt, and by floating upon it can form a film preventing normal granule-asphalt contact.

The upper size limitation is fixed by a tendency in all aggregates to size segregate in handling. Aggregates in which the ratios between largest and smallest diameters are in the order of about 25:1 and greater cannot be handled in a manner to maintain constant size quantity ratio. For the purposes of this invention, the limiting sizes for roofing granules can be taken at about 1" on the large side, and about $1/16$ on the small side. Also, since the random shape of any product of rock crushing prevents an absolute contact match between two adjacent granules, a highly efficient rock mosaic requires maximum amounts of the largest granules allowable in the size range selected and smaller sizes in those amounts required to fill the interstices, such sizes being present down to smallest ones practical.

Under the above premises, the proper quantities can be determined by a theoretical division of the aggregate into a multiplicity of range sizes by screening, the apertures of the screens used for the ranges increasing from smallest to largest by equal increments, and each granule size range so separated being designated by an integer corresponding to its position in the series of ranges formed.

Thus, using a set of screens with circular holes with $1/16$" differential between them, the series of ranges would be as follows.

| Range number: | Granule size |
|---|---|
| 1 | $1/16$ to $1/8$ |
| 2 | $1/8$ to $3/16$ |
| 3 | $3/16$ to $1/4$ |
| 4 | $1/4$ to $5/16$ |
| 5, etc. | $5/16$ to $3/8$, etc. |

If the total aggregate thickness when applied on a roof be likewise divided into layers, each of which is equal in thickness to the screen size differential used, and correspondingly numbered from bottom to top, each layer would have the composition of the following:

| Layer 1 | Sizes 1, 2, 3, 4, 5, etc. |
|---|---|
| Layer 2 | Sizes 2, 3, 4, 5, etc. |
| Layer 3 | Sizes 3, 4, 5, etc. |
| Layer 4 | Sizes 4, 5, etc. |
| Layer 5, etc. | Sizes 5, etc. |

Thus, as a general expression, if the total number of layers and sizes be designated by the letter $n$, the fractional part of the whole volume constituted by each respective range would be—

| Range number: | Volumetric proportion of whole |
|---|---|
| 1 | $1/n$. |
| 2 | $2/n$. |
| 3 | $3/n$. |
| 4 | $4/n$. |
| 5, etc. | $5/n$, Etc. |

Many size ranges can be made using various size limits and various size increments, by the use of the general size proportioning set out above. The thickness of cover desired by architects or designers, the temperature-flow characteristics of the asphalt or coal tar used, the thickness of the asphalt flood coat, etc. all may influence the limiting factors of the aggregate. There will always be at least two ranges. The maximum number of ranges for a commercial product will ordinarily be five, because the product then is defined as well as is usually needed, and better definition is economically unjustified. More ranges could, of course, be provided if desired.

A few specific volumetric ratios are given as specific examples. The rocks in each size ranges are present in the mixture in a volumetric proportion equal to the number of the range divided by the sum of all the range numbers. Thus, when there are two ranges, the relationship is as follows: range 1 (the smaller size), $1/3$; range 2, $2/3$. When there are three ranges, the relationship is as follows: range 1 (the smallest size), $1/6$; range 2 (the next larger size), $2/6$; range, 3, $3/6$. When there are four ranges, the relationship is as follows: range 1 (the smallest size), $1/10$; range 2, $2/10$; range 3, $3/10$; range 4, $4/10$. When there are five ranges, the volumetric proportions are as follows: range 1 (the smallest size), $1/15$; range 2, $2/15$; range 3, $3/15$; range 4, $4/15$; range 5, $5/15$.

The particle sizes in each range are those which would be derived by passage through an upper vibrating screen and retention on a lower one, the screens having circular openings. It is to be understood that reference to circular openings in the screens is not a limitation on the product, but only a method of describing its composition. Therefore aggregates produced with other screens which would still give the same screen analyses would fall within the scope of the invention. In any given mixture, the diameter of the openings forming the upper screen in each of the ranges will differ by a substantially constant increment from range to range. The upper screens from range to range will, for roofing rock, preferably differ by increments no less than $1/16$" and no greater than $1/4$". Increments of less than $1/16$" are too small to be of any advantage in carrying out the invention. Since there must be at least two ranges (and preferably there will be three or more), increments greater than $1/4$" are unsuitable for the reason that providing a plurality of layers including rocks of the resultant larger sizes would result in rock layers of excessive thickness. Should larger rocks be desired for esthetic effect, they can be placed on the roof either before or after the mixture according to the invention is applied.

For roofing rock, the preferred increments for upper range openings from range to range in any given sample are $1/16$" for some materials and $1/8$" for other materials. The increment is the same between all ranges in any given rock aggregate mixture. The lower screen of the lowest numbered range will always be made of such size as to pass all particles of a size which are deleterious to the application of rock to hot asphalt, that is, dust and particles which would pass through a $1/16$" circular opening. This defines a particle which would either dust the upper surface of the asphalt, thereby blanking it and making it impossible to have a good bond between the asphalt and the clean rock, or a particle which would simply be drowned in the asphalt.

Some specific examples of desirable mixtures of rock are given herewith. All dimensions are in inches. In each case, particles deleterious to application to hot asphalt are missing, having passed through the lower screen of the last-numbered range. However, some of these deleterious particles will still be found, because some are formed in handling, and some will not be removed by commercially feasible separation means, but they will not ordinarily exceed 1%, which is the meaning of their "substantial" omission.

|  | Example I (2 ranges, 1/8" increment) | | Example II (3 ranges, 1/16" increment) | | |
|---|---|---|---|---|---|
| Range | 1 | 2 | 1 | 2 | 3 |
| Percent by volume | 1/3 | 2/3 | 1/6 | 1/3 | 1/2 |
| Passed by | 1/8 | 1/4 | 3/16 | 1/4 | 5/16 |
| Retained on | 1/16 | 1/8 | 1/8 | 3/16 | 1/4 |

|  | Example III (3 ranges, 1/8" increment) | | | Example IV (4 ranges, 1/8" increment) | | | |
|---|---|---|---|---|---|---|---|
| Range | 1 | 2 | 3 | 1 | 2 | 3 | 4 |
| Percent by volume | 1/6 | 1/3 | 1/2 | 1/10 | 2/10 | 3/10 | 4/10 |
| Passed by | 1/4 | 3/8 | 1/2 | 1/4 | 3/8 | 1/2 | 5/8 |
| Retained on | 1/8 | 1/4 | 3/8 | 1/8 | 1/4 | 3/8 | 1/2 |

|  | Example V (4 ranges, 1/16" increment) | | | | Example VI (5 ranges, 1/8" increment) | | | | |
|---|---|---|---|---|---|---|---|---|---|
| Range | 1 | 2 | 3 | 4 | 1 | 2 | 3 | 4 | 5 |
| Percent by volume | 1/10 | 2/10 | 3/10 | 4/10 | 1/15 | 2/15 | 3/15 | 4/15 | 5/15 |
| Passed by | 5/16 | 3/8 | 7/16 | 1/2 | 1/4 | 3/8 | 1/2 | 5/8 | 3/4 |
| Retained on | 1/4 | 5/16 | 3/8 | 7/16 | 1/8 | 1/4 | 3/8 | 1/2 | 5/8 |

Examples II, IV, and VI are the presently-preferred embodiments of 3, 4, and 5 range aggregates. Example IV is the most versatile, and is the preferred one of these.

Examples may be derived for aggregates with increments larger than 1/8", such as those of 3/16" and 1/4", by reference to the above. Example V illustrates that the openings in the lower screen of range 1 can be greater than 1/16", but in practice they ought not to be significantly less.

Screen analyses have been made of roofing rock according to this invention which is readily producible commercially. These analyses are shown in FIGS. 1–3. It will be noted how closely that of FIG. 1 agrees with the theoretical value given in Example IV. FIGS. 2 and 3 illustrate the variability to be expected from commercial preparation of rock aggregates, but both closely approximate Example IV. Controls over these processes are not much better than an absolute numerical error of ±5% from the theoretical value in each range, because of the statistical action of the screens, and of variability of material from piece to piece. Therefore, all numerical examples should be read with these fairly wide tolerances. However, a comparison with FIGS. 4 and 5 shows the difference between aggregates according to this invention and commercial aggregates. In FIGS. 1–3 there is no "hump," the curve always having a negative slope. This is not true of FIGS. 4 and 5, both of which have a "hump" which is a maximum value. In FIGS. 4 and 5, lesser numbered ranges have, in some cases, greater volume proportions than larger numbered ranges, a situation which does not occur in an aggregate according to this invention. Where percentages in examples given do not total 100%, the difference in measurement error, or a small unavoidable amount of sand or fines which could not commercially be eliminated.

The materials according to FIGS. 1–3 have been spread upon standard roofing square of 100 square feet. Only about 75% as much weight of rock is needed for coverage of a given roof area as when rock such as that in FIGS. 4 and 5 are used. Thus, a rock layer of conventional aggregate is heavier for coverage of a given area. Even then the rock cover is not as stable, because in examples of FIGS. 4 and 5, and in all conventional aggregates, the provision of a volume proportion of smaller sizes greater than the volume proportion of larger sizes means that some of the smaller sizes will neither bond to the asphalt nor nestle between larger bonded pieces. Thus the heavier roof is not as stable and long-lasting as a roof using rock according to this invention.

Over a large number of roof applications, it has been found that approximately 20% less rock by volume is needed for the mixtures as specified in this invention, and that even considering the somewhat higher cost of this material as compared with conventional material, the total cost of rock necessary to give proper protection to an asphalt surface is reduced by at least 10%–15%.

This invention is not to be limited by the embodiments described in the description which are given by way of example and not of limitation, but only in accordance with the scope of the appended claims.

I claim:

1. A roofing material consisting essentially of a mixture of rock particles of heterogeneous size, random contour, rough fracture surfaces, and sharp fracture edges, said particles being present in a plurality of size ranges, said size ranges being numbered with successive integers, the range of smallest size particles being numbered number 1, rocks in each size range being present in the mixture in volumetric proportion equal to the number of the range divided by the sum of all the range numbers, each range of larger integer being present in the mixture in volumetric proportion greater than that of any range of lesser integer, the particle sizes being defined as those which would be derived by passage through circular openings in an upper vibrating screen and retention on a lower one, there being at least two of said ranges, the diameter of the openings in the upper screen in the respective ranges differing by a substantially constant increment from range to range, the increments being no less than one-sixteenth inch and no greater than one-quarter inch, the openings in the lower screen of each range being the same as the openings in the upper screen of the next lower range, the ratio of diameter of the largest upper to the smallest lower screen being no greater than about 25:1, the limiting sizes being about one inch for the largest size and about one-sixteenth inch for the smallest size.

2. A rock aggregate according to claim 1 characterized by its particles being substantially pyramidal and prismatic.

3. A roofing material to be applied to molten asphalt consisting essentially of a mixture of rock particles of heterogeneous size, random contour, rough fracture surfaces, and sharp fracture edges, said particles being present in a plurality of size ranges, said size ranges being numbered with successive integers, the range of smallest size particles being numbered number 1, rocks in each size range being present in the mixture in volumetric proportion equal to the number of the range divided by the sum of all the range numbers, the particle sizes being defined as those which would be derived by passage through circular openings in an upper vibrating screen and retention on a lower one, there being at least two of said ranges, the diameter of the openings in the upper screen in the respective ranges differing by a substantially constant increment from range to range, the increments being no less than 1/16" and no greater than 1/4", the openings in the lower screen of each range being the same as the openings in the upper screen of the next lower range, the lower screen of the lowest numbered range being of such size as to pass substantially all particles of size deleterious to the application of rock to hot asphalt, the openings in the upper screen of range 1 being no greater than about 1/4".

4. A roofing material according to claim 3 in which the incremental difference between the openings of the upper screens in the ranges is about 1/16".

5. A roofing material according to claim 4 in which the incremental difference between the openings of the upper screens in the ranges is about 1/8".

6. A roofing material according to claim 3 in which the incremental difference between the openings of the upper screens in the ranges is about 1/16", and the openings in the lower screen are about 1/16" diameter.

7. A roofing material according to claim 3 in which the incremental difference between the openings of the upper screens in the ranges is about 1/8", and the openings in the lower screen are about 1/16" diameter.

8. A roofing material to be applied to molten asphalt consisting essentially of a mixture of rock particles of heterogeneous size, random contour, rough fracture surfaces, and sharp fracture edges, said particles being present in a plurality of size ranges, the particle sizes being defined as those which would be derived by passage through circular openings in an upper vibrating screen and retention on a lower one, in the following volumetric proportions: 1/2 passage through screens with 1/4" diameter openings, and retained on screens with 3/16" openings; 1/3 passage through screens with 3/16" diameter openings and retained on screens with 1/8" diameter openings; and 1/6 passage through screens with 1/8" diameter openings and retained on screens with 1/16" diameter openings.

9. A roofing material to be applied to molten asphalt consisting essentially of a mixture of rock particles of heterogeneous size, random contour, rough fracture surfaces, and sharp fracture edges, said particles being present in a plurality of size ranges, the particle sizes being defined as those which would be derived by passage through circular openings in an upper vibrating screen and retention on a lower one, in the following volumetric proportions: 4/10 passage through screens with 1/2" diameter openings, and retained on screens with 7/16" openings; 3/10 passage through screens with 7/16" diameter openings and retained on screens with 3/8" diameter openings; 2/10 passage through screens with 3/8" diameter openings and retained on screens with 5/16" diameter openings; and 1/10 passage through screens with 5/16" diameter openings and retained on screens with 1/4" diameter openings.

10. A roofing material to be applied to molten asphalt consisting essentially of a mixture of rock particles of heterogeneous size, random contour, rough fracture surfaces, and sharp fracture edges, said particles being present in a plurality of size ranges, the particle sizes being defined as those which would be derived by passage through circular openings in an upper vibrating screen and retention on a lower one, in the following volumetric proportions: 2/3 passage through screens with 1/4" diameter openings, and retained on screens with 1/8" openings; and 1/3 passage through screens with 1/8" diameter openings and retained on screens with 1/16" diameter openings.

11. A roofing material to be applied to molten asphalt consisting essentially of a mixture of rock particles of heterogeneous size, random contour, rough fracture surfaces, and sharp fracture edges, said particles being present in a plurality of size ranges, the particle sizes being defined as those which would be derived by passage through circular openings in an upper vibrating screen and retention on a lower one, in the following volumetric proportions: 1/2 passage through screens with 3/8" diameter openings, and retained on screens with 1/4" openings; 1/3 passage through screens with 1/4" diameter openings and retained on screens with 1/8" diameter openings; and 1/6 passage through screens with 1/8" diameter openings and retained on screens with 1/16" diameter openings.

12. A roofing material to be applied to molten asphalt consisting essentially of a mixture of rock particles of heterogeneous size, random contour, rough fracture surfaces, and shap fracture edges, said particles being present in a plurality of size ranges, the particle sizes being defined as those which would be derived by passage through circular openings in an upper vibrating screen and retention on a lower one, in the following volumetric proportions: 4/10 passage through screens with 1/2" diameter openings, and retained on screens with 3/8" openings; 3/10 passage through screens with 3/8" diameter openings and retained on screens with 1/4" diameter openings; 2/10 passage through screens with 1/4" diameter openings and retained on screens with 1/8" diameter openings; and 1/10 passage through screens with 1/8" diameter openings and retained on screens with 1/16" diameter openings.

13. A roofing material to be applied to molten asphalt consisting essentially of a mixture of rock particles of heterogeneous size, random contour, rough fracture surfaces, and sharp fracture edges, said particles being present in a plurality of size ranges, the particle sizes being defined as those which would be derived by passage through circular openings in an upper vibrating screen and retention on a lower one, in the following volumetric proportions: 5/15 passage through screens with 5/8" diameter openings, and retained on screens with 1/2" openings; 4/15 passage through screens with 1/2" diameter openings and retained on screens with 3/8" diameter openings; 3/15 passage through screens with 3/8" diameter openings and retained on screens with 1/4" diameter openings; 2/15 passage through screens with 1/4" diameter openings and retained on screens with 1/8" diameter openings; and 1/15 passage through screens with 1/8" diameter openings and retained on screens with 1/16" diameter openings.

References Cited in the file of this patent

Abraham: "Asphalts and Allied Substances," fifth edition, January 1945, insert opposite page 646 (Table LXXXII–A).